(12) United States Patent
Bruhnke et al.

(10) Patent No.: US 6,272,321 B1
(45) Date of Patent: Aug. 7, 2001

(54) METHOD FOR TUNING AN OSCILLATING RECEIVER CIRCUIT OF A TRANSPONDER BUILT INTO A RFID SYSTEM

(75) Inventors: Michael Bruhnke, Munich; Konrad Hirsch, Blaustein; Marc Melchior, Kammerberg; Andreas Schülgen, Eching, all of (DE)

(73) Assignee: Temic Semiconductor GmbH, Heilbronn (DE)

( * ) Notice: Subject to any disclaimer, the term of this patent is extended or adjusted under 35 U.S.C. 154(b) by 0 days.

(21) Appl. No.: 09/254,866

(22) PCT Filed: Sep. 13, 1997

(86) PCT No.: PCT/EP97/05011

§ 371 Date: Jul. 12, 1999

§ 102(e) Date: Jul. 12, 1999

(87) PCT Pub. No.: WO98/11505

PCT Pub. Date: Mar. 19, 1998

(30) Foreign Application Priority Data

Sep. 13, 1996 (DE) ............................................... 196 37 319

(51) Int. Cl.⁷ ..................................................... H04B 5/00
(52) U.S. Cl. .......................................... 455/41; 455/196.1
(58) Field of Search ............................... 455/41, 73, 106, 455/107, 121, 123, 129, 196.1; 375/192.1, 192.2, 192.3, 304, 334, 344; 340/80.1, 10.2, 10.3, 10.4

(56) References Cited

U.S. PATENT DOCUMENTS

| | | | |
|---|---|---|---|
| 5,293,400 | * | 3/1994 | Monod et al. .......................... 455/41 |
| 5,491,715 | * | 2/1996 | Flaxl ....................................... 455/41 |
| 5,550,536 |   | 8/1996 | Keine . |
| 5,673,018 | * | 9/1997 | Lowe et al. ............................. 455/41 |

FOREIGN PATENT DOCUMENTS

| 44 38 286 | 9/1996 | (DE) . |
|---|---|---|
| 44 38 287 | 9/1996 | (DE) . |

* cited by examiner

*Primary Examiner*—Thanh Cong Le
(74) *Attorney, Agent, or Firm*—Venable; George H. Spencer; Robert Kinberg

(57) ABSTRACT

The invention relates to a method for calibrating an oscillating receiver circuit of a transponder in an RFID system to resonance to the frequency of an inquiry signal transmitted by a reader, the oscillating receiver circuit comprising at least one inductive resistor and at least one capacitor. Immediately after the start of reception of the inquiry signal, capacitors are connected in increments to the capacitance of the oscillating receiver circuit until such time as the rectified, smoothed inquiry signal assumes a maximum voltage value. This active self-calibration is performed upon each initialization of the transponder but can also be addressed by having the reader send a special sequence to the transponder.

10 Claims, 6 Drawing Sheets

METHOD FOR TUNING AN OSCILLATING RECEIVER CIRCUIT OF A TRANSPONDER BUILT INTO A RFID SYSTEM

The invention relates to a method for calibrating an oscillating receiver circuit of a transponder in an RFID system to resonance to the frequency of an inquiry signal transmitted by a reader, the oscillating receiver circuit comprising at least one inductive resistor and at least one capacitor.

In identifying persons, animals and objects, in recent years a system has proved itself in which a stationary or portable reader supplies a transponder, connected to the object to be identified, with energy via an alternating field, wherein the transponder responds by transmitting the data stored in it. Because of the frequency range used, these are also known as radial frequency identification systems, or RFID for short.

An RFID transponder in general comprises an antenna coil and an integrated circuit, which contains all the necessary electric circuit blocks, for instance for voltage supply, for clock pulse generation, for sequence control, and for storing the data necessary for the identification. The capacitor connected parallel to the antenna coil is also often a component of the integrated circuit. However, it can also be formed by a discrete component.

The RFID reader comprises an oscillating circuit with a transmitting coil and a capacitor, and the circuit is triggered by a driver stage with a signal, generally at a fixed frequency, such as 125 kHz. The reader also includes electronic circuit blocks, for detecting the data sent by the transponder as a result of the absorption modulation, and for sending data and instructions, for instance to modulate the field, to the transponder.

In data or energy transmission, the reader and transponder form a loosely coupled transformer. The energy transmission is therefore relatively slight.

The attainable range for contactless transmission of energy and data is affected by the following peripheral conditions:
- transmission energy (limited by regulations set by law)
- coil dimensions
- ambient noise level
- conformance of the resonant frequencies
- modulation rise
- voltage loss via the rectifier stage
- transmission methods employed So that a voltage sufficient for its operation will be available to the transponder; the oscillating receiver circuit, formed by the antenna coil and the parallelconnected capacitor, should be operated in resonance with the transmission frequency.

Because of tolerances in the components when the transponder is manufactured, this is generally not assured.

The object of the invention is therefore to disclose a method so that during transponder operation, the oscillating receiver circuit will be operated to resonance to the frequency of the inquiry signal.

This object is attained by a method as defined by the characteristics of claim 1.

A further object is to disclose a circuit arrangement for performing the method.

This object is attained by a circuit arrangement having the characteristics of claim 10.

The advantageous embodiment of the invention is made in accordance with the characteristics of the dependent claims.

The invention will be described below in terms of an exemplary embodiment in conjunction with the drawings.

For instance, in the use thereof in the form of an immobilizer, because of the small transmission coil disposed around the ignition key, extremely unfavorable transmission conditions arise. This requires optimizing the system from minimal losses. Decisive factors here are

- equal resonant frequency of the base station and transponder
- chronologically optimized transmission protocols
- minimal losses in energy transmission
- maximum modulation rise in data transmission to the base station (read)
- optimize data transmission to the transponder (send)

To assure that the energy for operating the transponder and transmitting the data will suffice, despite the slight electromagnetic field sent by the base station, the resonant frequencies should match. This is not feasible from a production standpoint, because of the component tolerances of the capacitors, coils, and so forth.

Below, a method will be described in which the transponder calibrates itself to the resonant frequency of the base station during the initializing phase.

Figure 4:
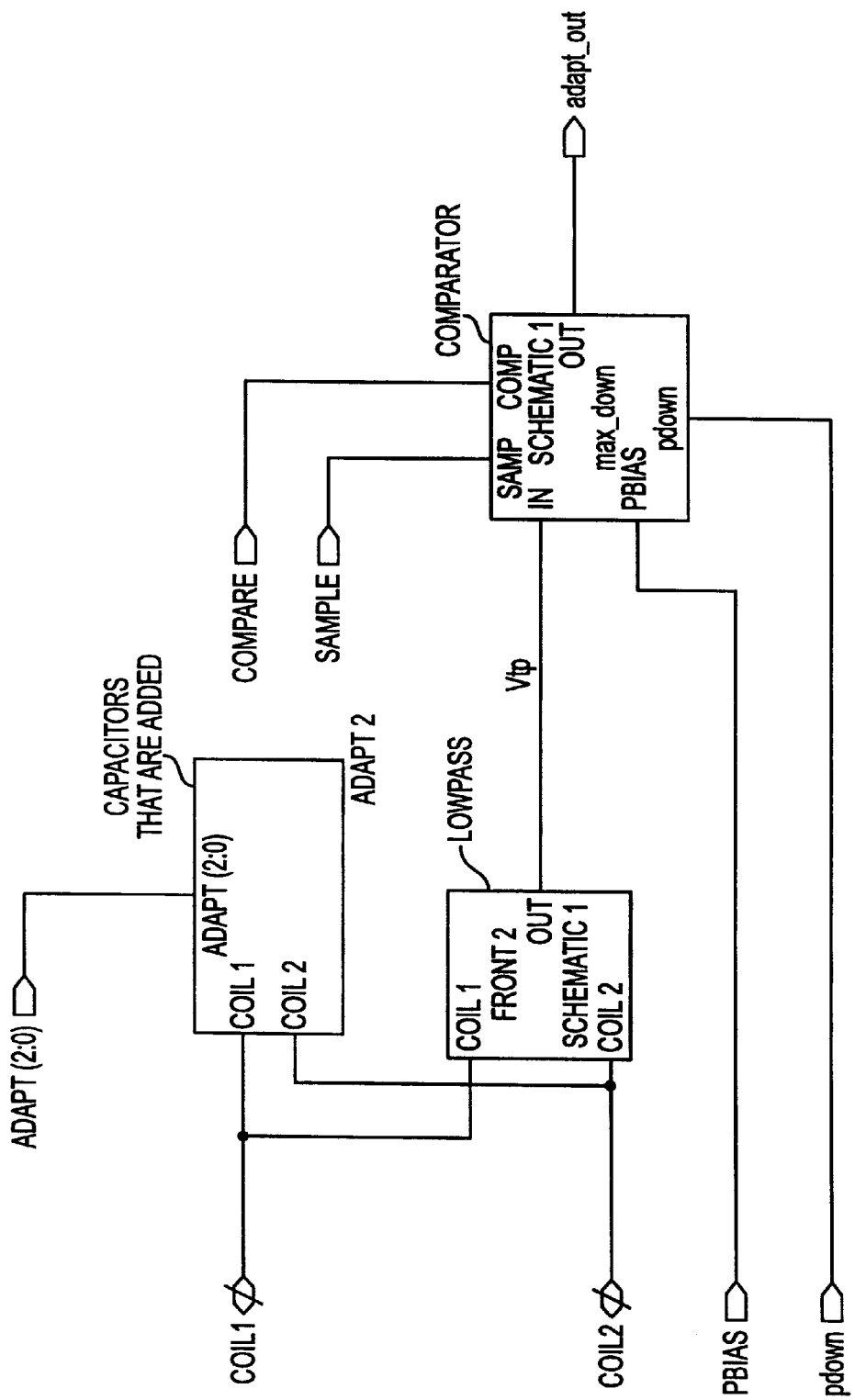
FIG. 4 shows a block circuit diagram of a first circuit arrangement for performing the method.
Figure 5:
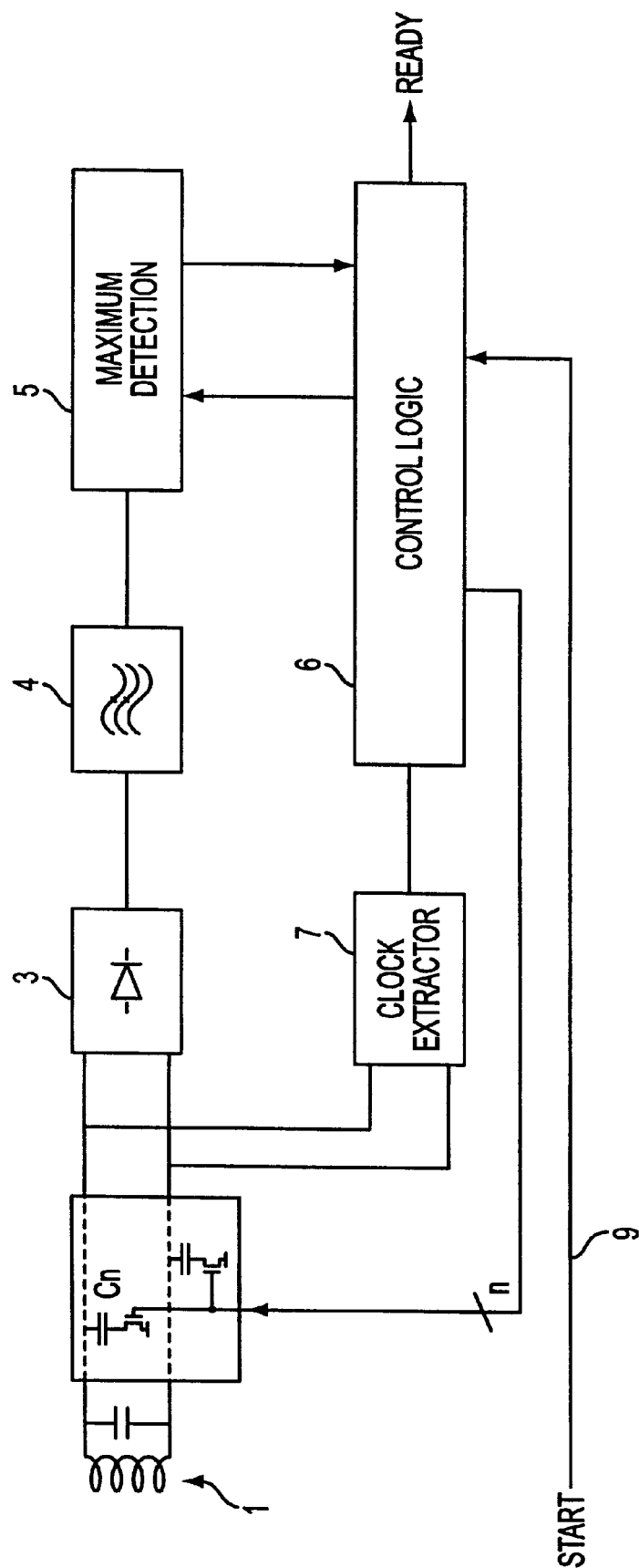
FIG. 5 shows a block circuit diagram of the circuit arrangement of a second circuit arrangement for performing the method.
Figure 6:
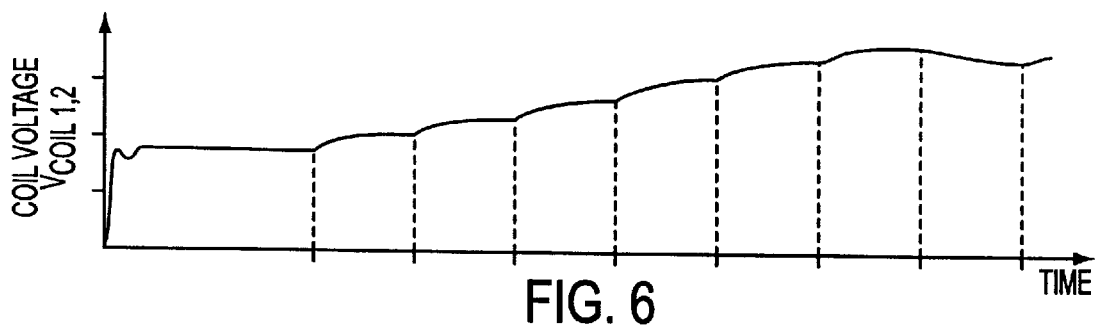
FIG. 6 shows the change in the coil voltage $V_{coil}^{1/2}$ in the course of the calibration.
Figure 7:
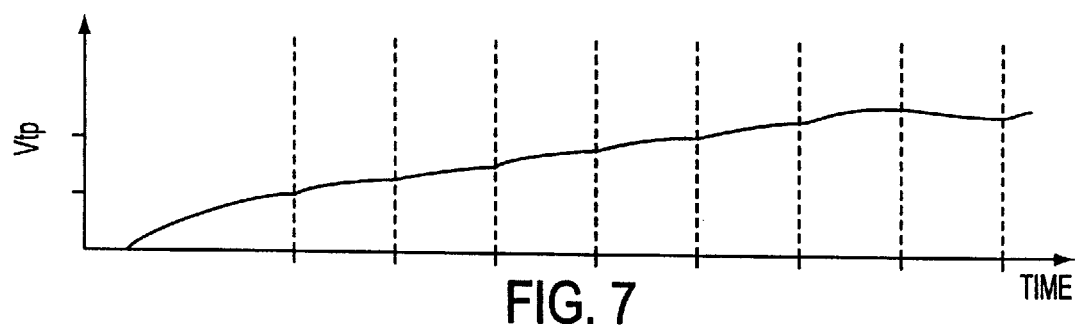
FIG. 7 shows the change in the output voltage of the filter stage in the course of the calibration.
Figure 8:
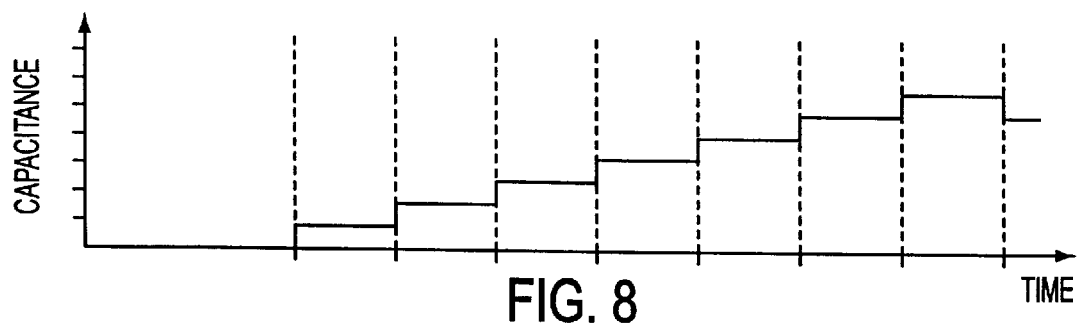
FIG. 8 shows the change in the total capacitance of the oscillating receiver circuit in the course of the calibration.

A method has been developed in which the transponder calibrates itself to the resonant frequency of the base station during the initializing phase. This is done by connecting capacitors in stages to the LC oscillating circuit and adjusting them to the maximum voltage value. The coil voltage $V_{ciol}$ is rectified and smoothed by means of a lower-pass filter. This voltage Vtp,1 is stored in memory. Next, in uniform steps, capacitors arc connected parallel to the LC oscillating circuit, and as a result the resonant frequency and hence also the induced voltage or Vtp change. This new Vtp, 2 voltage is compared with the previous voltage Vtp,1, by means of a comparator. As soon as Vtp, n+1 is less than Vtp,n, this is recorded, and the capacitor value of Vtp,n (maximum value) is added. This active self-calibration of the resonant frequency is performed upon each initialization, but it can also be addressed by having the base station send a special sequence to the transponder. FIGS. 4–5 show block circuit diagram of a circuit arrangement for performing the method. FIGS. 6–8 show the change in the voltages in the course of the calibration.

Figure 1:
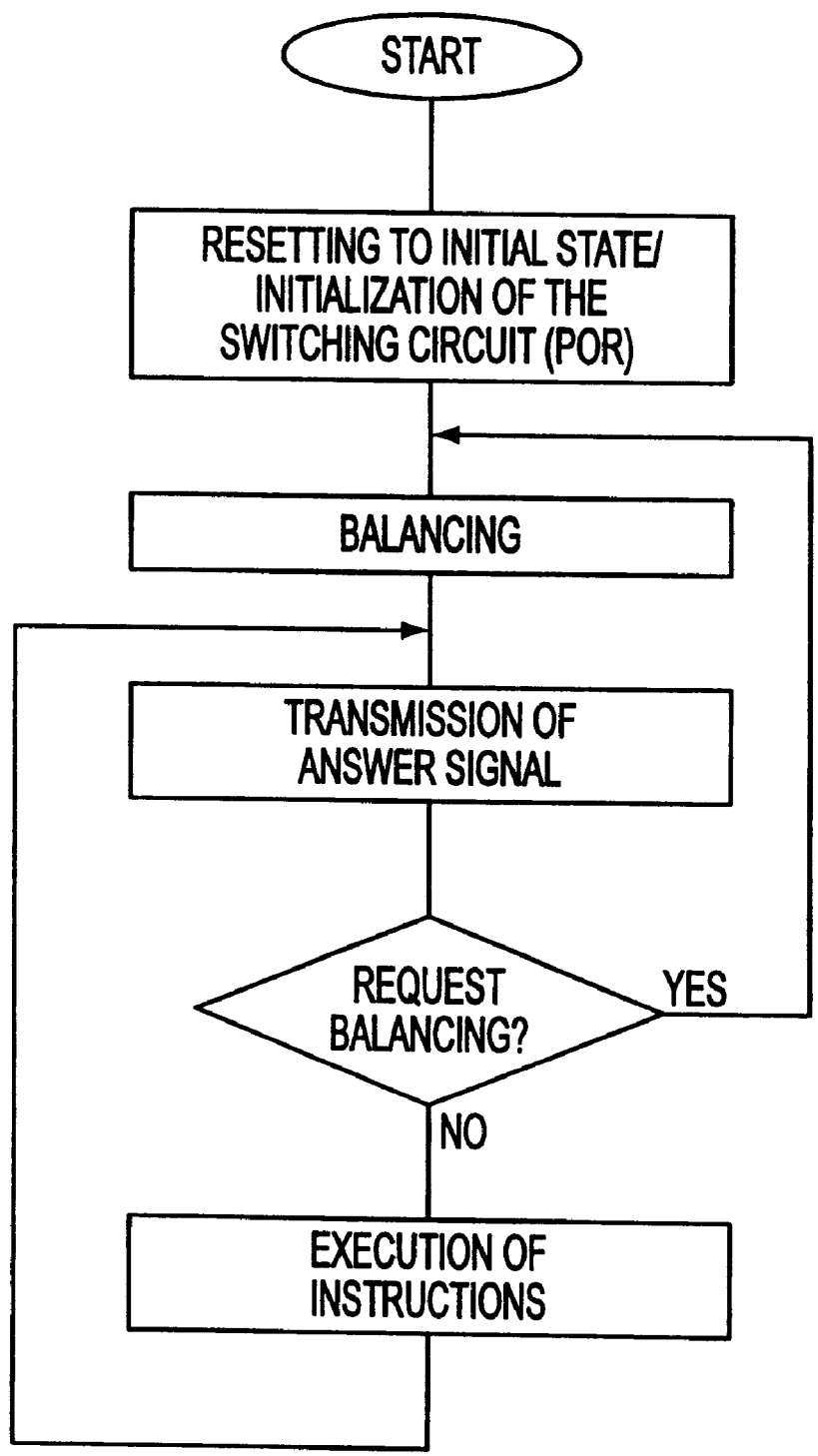
FIG. 1, a flowchart for the method.
Figure 2:
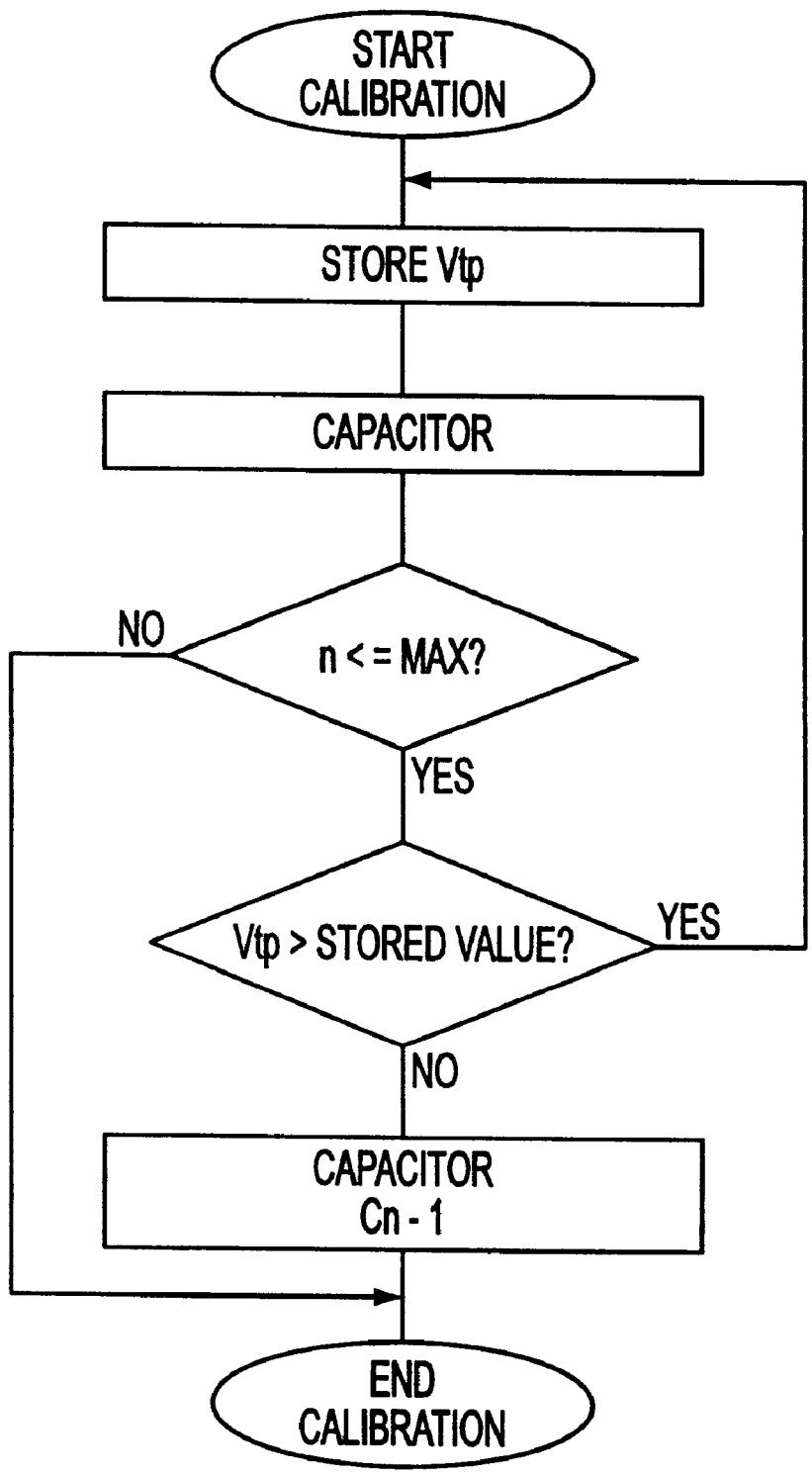
FIG. 2, the course of calibration in accordance with a first feature of the method.

Advantage: better energy transmission→higher supply voltage+greater modulation rise (in the weak field)→greater functional range FIG. 1 shows a flowchart for the method. The method step of "calibration" is shown in more detail in FIGS. 2 and 3. First, the course of the method will be described in terms of FIGS. 1 and 2.

After the start of reception of an inquiry signal and once the integrated circuit has been set to a defined outset state by resetting, the coil voltage $V_{coil}$ is rectified and, by means of a low-pass filter, smoothed. The voltage Vtp,1 thus generated is temporarily stored as a reference value in a memory SP. Next, in uniform steps, capacitors Cn are connected parallel to the LC oscillating circuit of the oscillating receiver circuit. As a result, its resonant frequency and thus the induced coil voltage $V_{coil}$ and finally also the rectified and smoothed voltage Vtp change. By adding a first capacitor C1, the voltage Vtp used for evaluation also varies along with the resonant frequency of the oscillating receiver circuit. This new, changed voltage Vtp,2 present at a second time, is compared by means of a comparator with the previous voltage Vtp,1 stored in the memory. If the voltage Vtp,2 present at the second time is greater than the value stored in the memory, then instead of the previous voltage Vtp,1, the new voltage Vtp,2 is written into the memory, the next capacitor is added, and the comparison is repeated with the new pair of values, that is, the new, third voltage Vtp,3 and the value of the second voltage Vtp,2 that has been stored in the memory.

If the voltage Vtp,2 present at the second time is less than the value stored in the memory, this means that the currently set frequency of the oscillating receiver circuit is moving away relative to the previously set value of the resonant frequency toward the inquiry signal. Then the setting of the capacitors that lead to the value of the voltage Vtp stored in the memory is added to the oscillating receiver circuit, and the calibration is ended.

In general, the calibration is performed until such time as the instantaneously applied voltage Vtp,n+1 is less than the value, stored in the memory, of Vtp,n. If such a condition is recorded, then the calibration is discontinued, and the capacitor value that lead to the voltage Vtp,n (maximum value) stored in the memory is added to the oscillating receiver circuit.

This active self-calibration of the oscillating receiver circuit to resonance to the frequency of the inquiry signal is done upon each initialization but can also be addressed by having the base station send a special sequence to the transponder.

Figure 3:
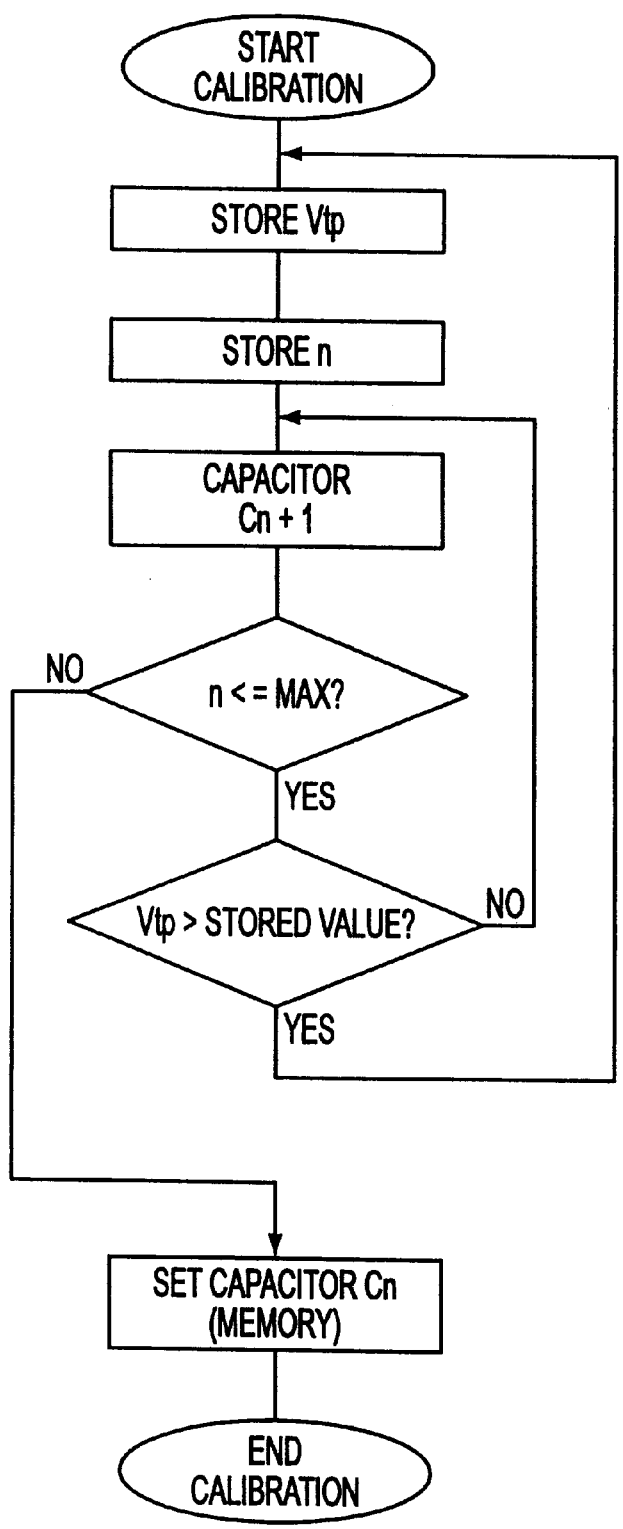
FIG. 3, the course of calibration in accordance with a second feature of the method.

In a second feature of the method, which is shown in FIGS. 1 and 3, the entire range of the calibration is first run through completely. At the end, the capacitors for which the maximum rectified and smoothed voltage Vtp was stored in the memory are added to the oscillating receiver circuit.

After the start of reception of an inquiry signal and once the integrated circuit has been set to a defined outset state by resetting, the coil voltage $V_{coil}$ is rectified and, by means of a low-pass filter, smoothed. In a second memory, a reference number that unambiguously describes the configuration of the capacitors Cn is stored. The voltage Vtp,1 thus generated is temporarily stored as a reference value in a memory SP. Next, in uniform steps, capacitors Cn are connected parallel to the LC oscillating circuit of the oscillating receiver circuit. As a result, its resonant frequency and thus the induced coil voltage $V_{coil}$ and finally also the rectified and smoothed voltage Vtp change. By adding a first capacitor C1, the voltage Vtp used for evaluation also varies along with the resonant frequency of the oscillating receiver circuit. This new, changed voltage Vtp,2 present at a second time, is compared by means of a comparator with the previous voltage Vtp,1 stored in the memory. If the voltage Vtp,2 present at the second time is greater than the value stored in the memory, then instead of the previous voltage Vtp,1, the new voltage Vtp,2 and the new reference number unambiguously described in the configuration of the capacitors Cn are written into the memory, the next capacitor is added, and the comparison is repeated with the new pair of values, that is, the new, third voltage Vtp,3 and the value of the second voltage Vtp,2 that has been stored in the memory.

If the voltage Vtp,2 present at the second time is less than the value stored in the memory, then without changing the memory contents, the next capacitor is added, and the comparison is repeated with the new pair of values, that is, the new, third voltage Vtp,3 and the value of the second voltage Vtp,2 that has been stored in the memory.

Once the entire range of the calibration has been run through completely, the configuration of capacitors Cn that corresponds to the reference number stored in the memory is added to the oscillating receiver circuit.

This method of the calibration is preferable particularly whenever a particular chronological behavior of the transponder is desired when the inquiry signal is turned on or when the transponder enters into an inquiry field.

FIG. 4 shows a first exemplary embodiment of a circuit arrangement for performing the method, in the form of a block circuit diagram. For calibrating the oscillating receiver circuit to resonance to the frequency of the inquiry signal, this circuit arrangement has the following function units:

The oscillating receiver circuit of the transponder comprises at least one inductive resistor and at least one capacitor and is connected to the circuit arrangement via the terminal pair coil1/coil2. This pair comprises many capacitors, which can be connected by triggerable switches parallel to the capacitor of the oscillating receiver circuit, which is represented in FIG. 4 by the circuit block captioned "adapt". Also connected to the terminal pair coil1/coil2 is a low-pass filter, represented in FIG. 4 by the circuit block designated "front2". The output signal Vtp of the low-pass filter is delivered to a comparator stage, represented in FIG. 4 by the circuit block captioned "max_detect". In the comparator stage, the output signal Vtp of the low-pass filter is compared with the maximum value stored there that has occurred previously. As a function of its output signal "adapt_out", the many capacitors captioned "adapt" are triggered.

FIG. 5 shows the circuit arrangement again in an improved view. Only the function units of the transponder that contribute substantially to the function of the calibration are shown. The oscillating receiver circuit 1 of the transponder, comprising at least one inductive resistor and at least one capacitor, together with the oscillating circuit of the reader, not shown, forms a loosely coupled transformer. Many capacitors 2, which can be added to the capacitor of the oscillating receiver circuit by means of triggerable switches, are disposed parallel to the capacitor of the oscillating receiver circuit 1. Triggering the switches is effected by means of a control logic 6. The control logic 6 is also supplied with a clock signal generated from the inquiry signal. On the basis of this clock signal, many capacitors, which by triggerable switches can be connected parallel to the capacitor of the oscillating receiver circuit, are triggered in stages and intermittently. The oscillating receiver circuit 1 is also connected to a rectifier stage 3 and a clock generator circuit 7. The signal rectified by the rectifier stage 3 is delivered to a filter stage for smoothing. The filter stage is embodied as a low-pass filter. The signal thus rectified and smoothed is delivered to the input of a maximum detector 5. The maximum detector compares the signal present at its input with a variable stored in memory and puts whichever is greater into its memory. As a result, the memory of the maximum detector always contains the highest value for the rectified, smoothed signal since the start of the calibration. The maximum detector 5 is connected to the control logic 6, so that the control logic 6 ends the calibration performance when the signal present at the input of the maximum detector 5 becomes less than the value stored in the memory thereof. The control logic 6 then sets the switchable capacitors such that once again the maximum value is attained, and at a further output it indicates that the calibration is ended.

The switchable capacitors preferably comprise a series circuit of 1 capacitor and 1 switching transistor; the switching transistor is triggered by the control logic. One pair each of identically dimensioned capacitors are triggered by the control logic; the first series circuit of a capacitor and a switching transistor connects a first terminal of the oscillating receiver circuit to the ground potential, and the second series circuit of a capacitor and a switching transistor connects a second terminal of the oscillating receiver circuit to the ground potential.

In FIGS. 6 and 7, the changes in the coil voltage of the oscillating receiver circuit (FIG. 6) and the attendant change in the output voltage of the filter stage (FIG. 7) are shown. In FIG. 8, the change in the total capacitance of the oscillating receiver circuit, which is brought about by adding the switchable capacitors C1"Cn, is shown. The time axes in FIGS. 6–8 are identical.

In an advantageous feature the control logic includes an n-stage dual counter, whose outputs trigger n pairs of capacitors and switches. The values of the individual pairs of capacitors are selected such that they are binary-weighted in graduated form in pairs and thus cover a wide range of values. For instance, a four-stage binary counter, at its outputs, would trigger four pairs of capacitors. The capacitances then correspond to the respectively assigned counter stages and amount to 1, 2, 4 and 8 times a basic value, such as 10 pF. With such an arrangement, the oscillating receiver circuit, besides its basic setting, can be changed in 15 stages.

In a further feature of the circuit arrangement, all the capacitors are embodied of the same size. They can then be either directly triggered or connected together into groups that correspond to the above-described binary-weighted values.

By means of the method described above and the associated circuit arrangement, it is possible to tune the oscillating receiver circuit of a transponder to resonance to the frequency to the inquiry signal. This calibration can be done each time the transponder is put into operation, or can be tripped by a predetermined command from the reader. The method and the circuit arrangement can also be employed for a one-time factory calibration to a predetermined frequency, in order to compensate for component tolerances of the oscillating receiver circuit, In that case, the setting ascertained by a one-time calibration, for instance the counter state of the counter that triggers the switches of the capacitors, is stored permanently in a read only memory of the transponder and used again upon each initialization to trigger the capacitors.

What is claimed is:

1. A circuit for calibrating an oscillating receiver circuit of a transponder in a radial frequency identification system to resonance to the frequency of an inquiry signal generated by a reader, comprising:

an oscillating receiver circuit having at least one inductive resistor and at least one capacitor;

a plurality of capacitors, which can be switched by triggerable switches parallel to the capacitor of the oscillating receiver circuit;

a rectifier stage, connected to the oscillating receiver circuit, rectifying the inquiry signal;

a filter stage, connected to the rectifier stage, smoothing the rectified signal;

a maximum detector, detecting a maximum in the smoothed, rectified signal;

a control logic triggering the switches to engage capacitors as a function of the status of the maximum detector.

2. The circuit of claim 1, wherein the switchable capacitors comprise a series circuit of one capacitor and one switching transistor, and that the switching transistor is triggered by the control logic.

3. The circuit of claim 2, wherein one pair each of identically dimensioned capacitors are triggered by the control logic; wherein the first series circuit of a capacitor and a switching transistor connects a first terminal of the oscillating receiver circuit to the ground potential; and wherein the second series circuit of a capacitor and a switching transistor connects a second terminal of the oscillating receiver circuit to the ground potential.

4. The circuit arrangement of claim 3, wherein the control logic includes an n-stage dual counter, whose outputs trigger n pairs of capacitors and switches.

5. A method for calibrating an oscillating receiver circuit of a transponder in a radial frequency identification system to resonance to the frequency of an inquiry signal transmitted by a reader, the oscillating receiver circuit comprising at least one capacitor, the method comprising the steps of:

transmitting the inquiry signal from the reader to the oscillating receiver circuit;

changing capacitance of the oscillating receiver circuit in increments by adding or subtracting capacitances, wherein the capacitances of the capacitor are graduated in binary-weighted form and the capacitors are triggered using a binary counter; and retaining counter state of the binary counter at the maximum voltage value in order to perform the calibration.

6. The method of claim 5, further comprising the steps of:

performing calibration of the oscillating receiver circuit immediately after start of reception of the inquiry signal.

7. The method of claim 5, further comprising the step of:

transmitting a command from the reader to the oscillating receiver circuit; and performing the calibration after the reception of the corresponding command sent by the reader.

8. The method of claim 5, further comprising the step of performing the calibration to resonate to the frequency by changing the capacitance so that the calibration begins at a higher frequency and ends at a lower frequency.

9. The method of claim 5, further comprising the step of performing the calibration to resonate to the frequency by changing the capacitance so that the calibration begins at a lower frequency and ends at a higher frequency.

10. A method for calibrating a transponder to the resident frequency of a base station during an initialization phase, comprising the steps of:

(a) providing an oscillating circuit;

(b) rectifying and smoothing a first induced voltage induced in a coil;

(c) storing said first induced voltage in memory;

(d) connecting a capacitor in parallel to the oscillating circuits to increase the capacitance of the transponder;

(e) storing a second induced voltage in memory based on the increased capacitance;

(f) comparing the second induced voltage to the first induced voltage;

(g) replacing the first induced voltage with the second induced voltage in memory;

(h) adding a capacitor if the second induced voltage is greater than the first voltage; and (i) repeating steps (d)–(i) until the second voltage is less than the first voltage; and (j) recording the capacitance associated with the first voltage so that the transponder calibrates itself to the resident frequency of the base station.

* * * * *